N. BJÖRGUM.
AUTOMATIC HAND GUN.
APPLICATION FILED FEB. 4, 1919.

1,360,873.

Patented Nov. 30, 1920.
9 SHEETS—SHEET 2.

FIG_7_

FIG_8_

FIG_10_

FIG_9_

N. BJÖRGUM.
AUTOMATIC HAND GUN.
APPLICATION FILED FEB. 4, 1919.

1,360,873.

Patented Nov. 30, 1920.
9 SHEETS—SHEET 5.

Inventor:
Nils Björgum
by
Attorney

N. BJÖRGUM.
AUTOMATIC HAND GUN.
APPLICATION FILED FEB. 4, 1919.

1,360,873.

Patented Nov. 30, 1920.
9 SHEETS—SHEET 9.

Inventor:
Nils Björgum
by [signature]
Attorney

UNITED STATES PATENT OFFICE.

NILS BJÖRGUM, OF CHRISTIANIA, NORWAY, ASSIGNOR TO A/S BJORGUMS GEVAER-KOMPANI, OF CHRISTIANIA, NORWAY.

AUTOMATIC HAND-GUN.

1,360,873.   Specification of Letters Patent.   Patented Nov. 30, 1920.

Application filed February 4. 1919. Serial No. 274,900.

*To all whom it may concern:*

Be it known that I, NILS BJÖRGUM, a subject of the King of Norway, of Christiania, Norway, have invented certain new and useful Improvements in Automatic Hand-Guns; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to automatic hand guns of the kind which are provided with a magazine of a type similar to that used in usual magazine guns.

A specific feature of this automatic magazine gun is that the function of the gun as automatic single loader and as automatic magazine loader is attained in the most complete manner. This is reached partly by the choice of type of mechanism, partly by special arrangements of the safety device of the trigger device and other devices in connection herewith through which arrangement the function of the breech mechanism for the different purposes is attained in a safe and simple manner.

My new gun belongs to the type of automatic guns that are generally called recoil loaders with short recoiling barrel and the breech mechanism is of the type that consists of a slider with rectilinear movement and having at the forward end a locking head with rotatory movement.

For the purpose of the invention the said slider and the trigger device of the gun are combined with a safety lever, which is pivoted at its rear end, said safety lever having a multiple function as shall be explained hereafter.

The arrangement of the breech casing, the slider, the locking head, the barrel sleeve and the firing pin (cock) is substantially the same as described in my Patent No. 1,007,911. The rear part of the breech casing is provided with a cover and the recoil spring is inserted between the cover and the breech casing.

The magazine is preferably arranged for taking up seven cartridges, the latter being supplied to the magazine from a cartridge holder in the usual manner when the breech mechanism is open. When the cartridge holder is taken away, the mechanism of itself returns to its locked position ready for firing. When the magazine is emptied the mechanism of itself remains in open position.

On the left side of the gun there is placed a shift arm by means of which the mechanism momentarily can be adjusted to act as an automatic magazine loader or to act as an automatic single loader. When the gun is used as single loader there always remain six cartridges in the magazine ready for being used at the moment when the highest possible velocity of firing is required.

When the mechanism attains its closed position, it is simultaneously locked or secured in this position by the safety lever. Before the gun can be fired the safety lever above mentioned is pressed down by means of the gunner's thumb thereby releasing the trigger and breech locking devices at the same time.

The above indicates the manner in which I prefer to arrange my gun, but it is clear that in some respects these arrangements may be modified to suit the special military requirements.

My invention relates to the several parts and mechanisms constituting the automatic magazine gun and in the following I shall describe one form of my invention reference being had to the accompanying drawings.

Fig. 2 is a vertical longitudinal section of the breech casing or frame and Fig. 3 a top view of the same.

Fig. 11 is a vertical longitudinal section of the breech part of the gun illustrating especially the trigger mechanism and adjacent parts. Fig. 11ᵃ is a detail view of the safety mechanism. Fig. 12 is a horizontal section of Fig. 11. In these figures the mechanism is shown in locked position with the safety lever in its locking position.

Figs. 13 and 14 are similar views of the rear part of the breech mechanism. In Fig. 13 the slider is shown in its most retracted position, the safety lever being shown in its lowest position in which the trigger is released and the shift arm is shown in the position in which it is placed when the gun is to act as an automatic gun. In Fig. 14 the slider is shown in an intermediate position in which the same is automatically locked when the shift arm is placed in the position in which it is placed when the gun is to act as a single loader.

Fig. 15 is a right hand side view of the breech mechanism with the parts in the same position in which they are shown in Fig. 11.

Fig. 16 is a cross section through the magazine and adjacent parts showing the cartridge arresting means in operative position.

Fig. 17 is a longitudinal vertical section and Fig. 18 a top plan view of the sear arm, the adjacent parts being shown in dotted lines.

Figs. 19 and 20 are cross sectional views of the sear arm and the adjacent parts showing the sear pin in two different positions relatively to the said arm. Fig. 21 is a detail end view of the cocking sleeve showing the form of the lug coöperating with the sear lug.

Figs. 22 to 26 illustrate the cartridge ejector, Fig. 22 being a left hand side view (partly in section) of the mechanism at the moment a cartridge is being ejected and Fig. 23 a similar view showing the parts the moment before ejection takes place. Figs. 25 and 26 are details of the ejector actuating mechanism.

Fig. 31 and Fig. 32 are left hand side views of the barrel and part of the gun showing the devices used for locking the barrel at its rearmost position. Fig. 31 shows the parts before and Fig. 32 after the recoil movement.

Figs. 35 and 36 illustrate the cartridge feeding mechanism. Figs. 35 and 36 being side views with the feeding lever in two different positions.

Having given a general description of the typical and functional features of the gun, I shall now in the following describe the special devices or groups of devices and their functions and thereupon explain more completely the working of the devices when the gun is used in the one or in the other way.

*The breech casing and slider.*

Figures 1, 4, 5, 6:
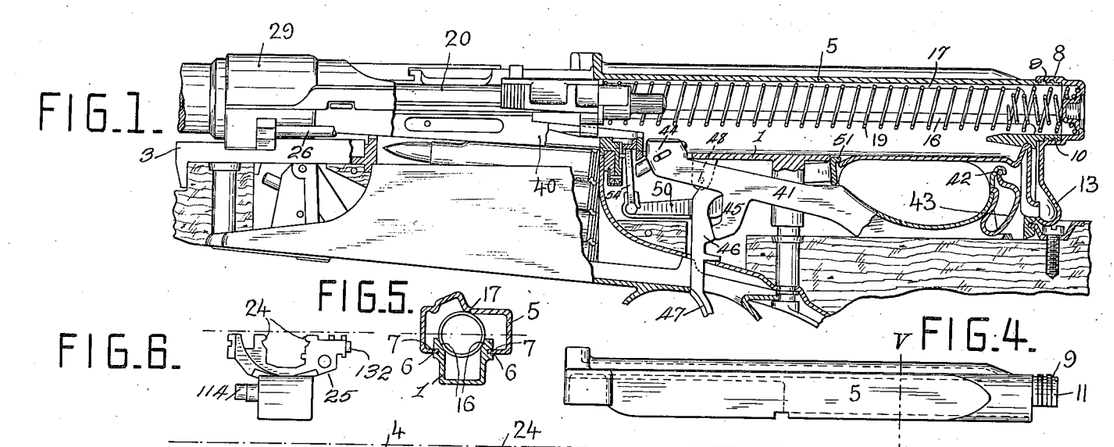
Figure 1 is a side view of the breech part of a gun, the rear part of said view being a vertical longitudinal section and the front part having parts broken away.
Fig. 4 is a side view of the top piece or cover of the breech casing.
Fig. 5 is a cross section on the line V—V of Figs. 2 and 4, the breech casing having its cover in place.
Fig 6 is a view of the left hand end of the breech casing shown in Fig. 3.

As mentioned above the breech mechanism substantially is the same and acts in the same manner as the breech mechanism used in the automatic firearm described in my U. S. A. Patent No. 1,007,911. In the following I therefore shall only describe the same here as far as is necessary for the understanding of the other parts of the gun, reference being had more particularly to Figs. 1 to 12. The breech casing on which all the mechanisms of the gun are mounted, consists of a long frame 1, the rear part of which has a channel shaped cross section as shown in Fig. 5. In front of this part, the frame has an opening 2 in the bottom, forming the entrance for the cartridges. In front of this opening the frame extends to form a guide 3 for the gun barrel in its recoiling movement being also provided with a groove 4, which coöperates with a lug on the locking head of the slider acting to turn the head from its open to its locked position and vice versa.

The rear part of the breech frame is covered by a top-piece 5 (see Figs. 4 and 5) which latter is fixed to the frame in the manner shown in Fig. 5, there being formed on the sides of the casing 1, longitudinal grooves 6 in which fit inwardly turned edges 7 of the top-piece 5. The top-piece is placed in position by being slid on to the frame from the rear.

The two parts are held together in this position by means of a nut 8 corresponding with threads 9 and 10 on the semi-cylindrical rear projections 11 and 12 on the top-piece 5 and the breech frame 1 respectively. The said nut has a downwardly projecting spring arm 13 by means of which the nut is secured to the breech frame, the lower end of said arm engaging a notch.

As shown in Fig. 5 there are formed at the top of the breech frame two faces 16; a similar face 17 is formed on the inside of the top-piece 5. These three faces lie in a circle concentric with the axis of the gun and form sliding faces for the recoil spring 19, whose rear end extends into the aforesaid nut 8 and whose front end abuts against the slider 20. The latter, which is a long hollow body, contains in its cylindrical bore the firing pin 21 with spring 22 and carries at its forward end the locking head 30, rests on the breech casing and is connected thereto by means of longitudinal grooves 23 (see Fig. 16) which correspond with ribs 24 on the forward end of the breech casing or more precisely at the part of the casing where the magazine is positioned.

The slider has a cylindrical form corresponding to the cylinder faces of the breech casing, so that the slider can be inserted in the gun (when the top-piece 5 is taken off) simply by letting it down on the faces 16 and then pushing it forward so that the ribs 24 will enter the grooves 23. Usually the slider is guided in its whole movement only by way of cylindrical faces. By the use of ribs 24 corresponding with the grooves in the slider a much steadier movement is obtained, because the least inaccuracy in the form of the cylindrical faces will cause an unsteady movement of the slider during the action of the mechanism, which may cause failure of one or more of the devices acting upon the slider or parts carried by the same.

Figs. 7, 8, 9 and 10 illustrate the locking head of the breech bolt and the gun barrel sleeve. As before mentioned the construction and function of these parts are substantially the same as in my U. S. A. Patent No. 1,007,911. One special feature of this locking mechanism is that the locking head has imparted thereto a combined rotatory and axial movement relatively to the barrel sleeve during the recoil movement of the barrel.

The object of said movement of the head is to cause an initial extraction movement of the cartridge and this movement is caused in a positive way by the coöperation of the cams on the locking head and the cam faces on the barrel sleeve.

As regards these parts, my present invention consists in the particular way in which the cam-faces on the barrel sleeve are formed and placed, which by the rotary movement of the locking head causes a relative axial movement between the parts. This improvement consists of two cam-faces, which are placed precisely diametrically opposite each other on the rear face of the barrel sleeve 29 and are formed as helical faces. In the said figures these faces are indicated at 31 and 32. They coöperate with lugs 33 and 34 on the locking head 30 said lugs having inclined faces 35 and 36 which are in contact with the said helical faces 31 and 32 on the barrel sleeve. When the barrel recoils, the lug 37 on the locking head runs in the groove 4 in the breech casing (see Figs. 2 and 3) and causes a rotary movement of the locking head and this rotary movement in its turn causes the lugs 33 and 34 to move on the cam-faces 31 and 32, thereby securing the aforesaid initial axial movement of the locking head relatively to the barrel sleeve.

By arranging the two cam-faces 31 and 32 in the manner described, I obtain a much steadier movement of the locking head relatively to the barrel sleeve, so that the extraction of the cartridge is performed in an absolutely safe way. If said cam-faces are not placed exactly opposite each other and the locking head is rocked a little transversely the extractor may then possibly lose its hold on the cartridge. Another advantage by forming the cam-faces in this manner is, that they can be made accurate in the machine as they may be made simultaneously.

*Trigger and safety mechanism.*

Reference being had especially to Figs. 11–21 I shall now describe the trigger mechanism and parts connected or coöperating therewith.

On the underside, the slider 20 is provided with an extension 40 (see Figs. 11, 35 and 36) which in the horizontal plan has the form of a rectangular frame (see Fig. 18), said frame serving to take up the part of the trigger mechanism carried by the slider and also serving as an abutment against a special safety lever 41, hereinafter described, to lock the slider in its closed position, so that the slider cannot if the gun is violently thrown against the field, recoil rearwardly and thereby cause the opening of the mechanism or even reloading.

Figures 11, 11A, 12:
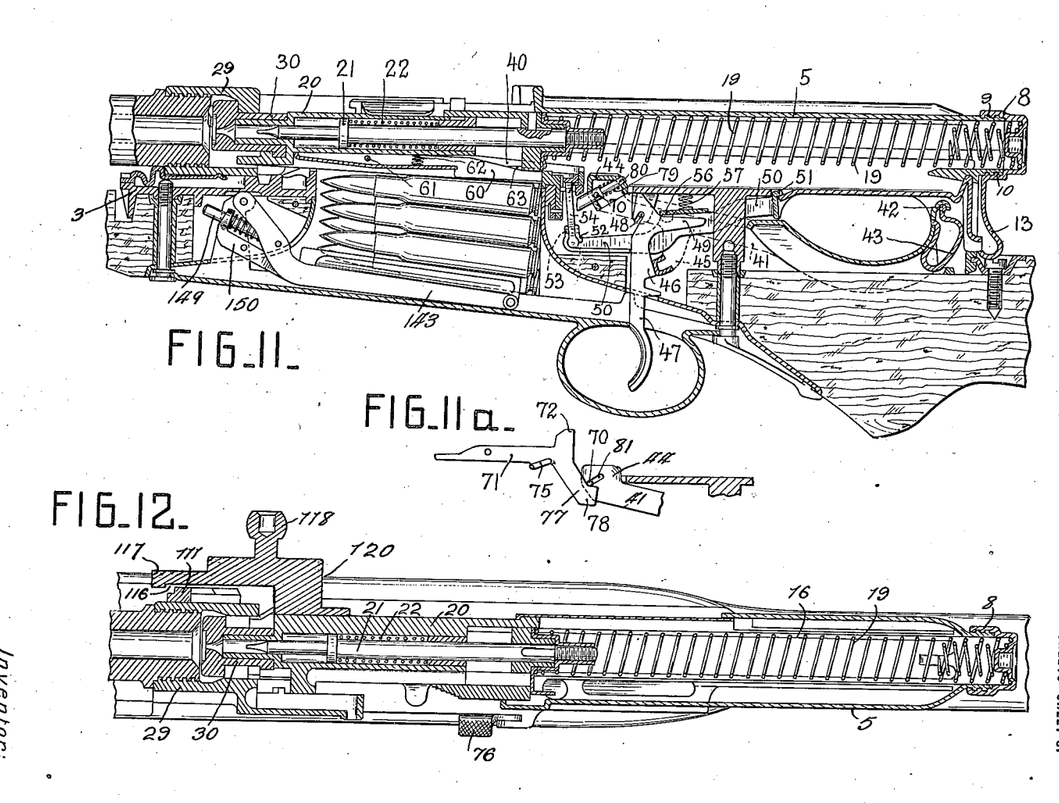
Figure 13:
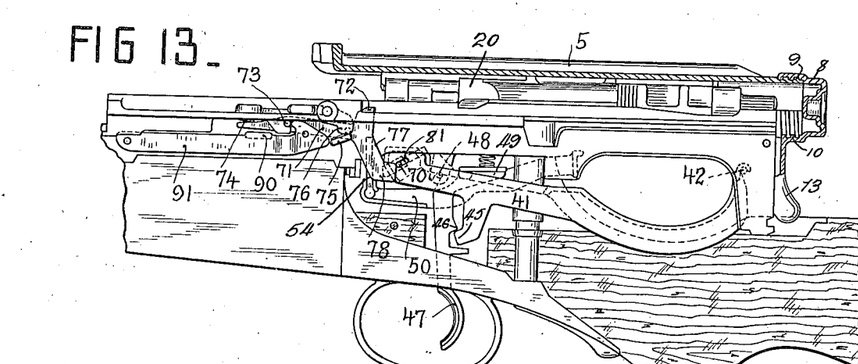

The said safety lever 41 is pivoted at 42 near its rear end and as close as possible underneath the breech casing. A spring 43 keeps the safety lever in its normal position shown in Fig. 11. The spring 43, as shown in Figs. 1 and 11, has the form of a loop, one arm of it being bent and inserted into an aperture in the lever, the other arm pressing against the rear wall of the casing and having its upper end abutting against the pin 42. The lever has such a shape that a suitable handle is formed on the top of the lever between its rear part and the breech casing. From this handle the lever projects underneath the breech casing and terminates in a hood shaped head 44 the front face of which forms a locking face for the before mentioned extension 40 of the slider. From the safety lever an arm 45 projects downwardly having, in the position shown in Figs. 1 and 11, contact against a lug 46 on the trigger 47. In this manner the trigger is prevented from performing its function as long as the safety lever remains in its lifted position.

The trigger mechanism consists of the trigger 47 pivoted at 48 and having a rearwardly extending arm 49, a lever 50 pivoted at 51 at its rear end has at its front end a knee 52 carrying a pin 53 which forms a pivot for the sear pin 54. The latter is formed as a lever which may turn on the pin 53 and the lower end of which is acted upon by a spring 55 pressing on the lever, so that its top end is pressed to the right (see Figs. 19 and 20). On the lever 50 there is provided a lateral projection 56 close above the arm 49 of the trigger and between this projection and the breech casing is placed a spring 57 serving to keep the lever 50 in its lowest position shown in Fig. 11. If the safety lever 41 is pressed downward so that the trigger is released, the arm 49 of the trigger, when the trigger is pulled rearwardly, will press the arm 50 upwardly, by which movement the sear pin 54 is lifted into contact with a lever 60, which is mounted within the frame 40 on the bottom side of the slider 20. The lever 60 is pivoted at 61 being kept by the spring 62 in the position shown in Fig. 11. The rear part of said lever 60 (reference being now specially had to Figs. 17, 18, 19 and 20) has in plan the shape of a frame and is on the inner side provided with lugs 63 which in this position (see Fig. 11) are situated just in front of a T-shaped lug 64 (see Fig. 21) projecting downwardly from the firing pin 21. When the arm 50 is pressed upwardly by means of the trigger the sear pin 54 hits the bottom side of the lever 60 and lifts it high enough to release the lug 64 from the hold of the lugs 63, the firing pin being thereby released and by its spring thrown forward and causing the firing. The aforesaid lug 64 has such shape that its vertical part 65 can pass between the lugs 63. The latter have on their lower side inclined faces 66 so that when the gun is cocked, the lug 64 can pass underneath the lugs 63 thereby slightly lifting the lever 60.

After the firing the slider 20 by the recoil action, moves to the rear and thereupon the recoil spring 19 carries it forward.

During these movements, the sear pin 54 in its lifted position should not come in contact with the sear lever 60 on the slider. For this reason the said lever is given the form of a frame, so that the top of the pin can play freely within the frame opening during these movements.

For the same reason the face on the lower side of the lever 60, against which the sear pin abuts at the firing, is arranged a lug 67 at the rear end of the frame opening inside of the same, said lug having an inclined surface at its front end. When the slider goes forward the top of the sear pin will hit against said inclined face of the lug 67 and turn to the left on its pivot 53 and thereby attain the position shown in Figs. 17, 18 and 19. When now the hold of the finger on the trigger is released and the lever 50 carrying the sear pin is pressed down, the top of the pin 54 will get below the lug 67 and the spring 55 will then cause the pin 54 to return from the position shown in Fig. 19 to the position shown in Fig. 20. The gun is then again ready for firing.

From the drawing it will be seen that the arm 49 of the trigger has such form relatively to the projecting arm 56 on the lever 50 that in the beginning of the rearward movement of the trigger the contact between the arms 49 and 56 will be close to the pivot 48, whereas at the end of the trigger movement the contact point between the said arms will be at the outer end of the arm 49. This arrangement is preferable for the reason that the trigger movement will in the beginning be very easy, whereas when the firing moment approaches, a greater power is required to move the trigger. In this way the attention of the soldier will be called to the fact that the firing point is near.

The head 44 of the safety lever 41 which serves to lock the slider 20 in its locking position also serves as a guide or holder for a sliding pin 70 (see Figs. 11ª, 13 and 14) whose function is, through the movement of the safety lever, to act upon a lever 71, provided with a lug or shoulder 72 which stops and locks the slider in its open position, when the mechanism is adjusted for loading by hand. The said lever 71 which lies on the left hand of the breech casing and is pivoted at 73, is kept in its lifted normal position by means of a spring 74 acting on the front end of the lever. The lever is provided with a laterally projecting inclined lug 75 with which coöperates a shift arm 76 in such way that the lower end of the latter presses on the said inclined lug so as to push the lever 71 with the shoulder 72 downward when the shift arm 76 is placed in the position shown in Fig. 13, whereas the lever 71 is free to take its lifted position when the shift arm 76 has the position shown in Fig. 14.

Figure 14:
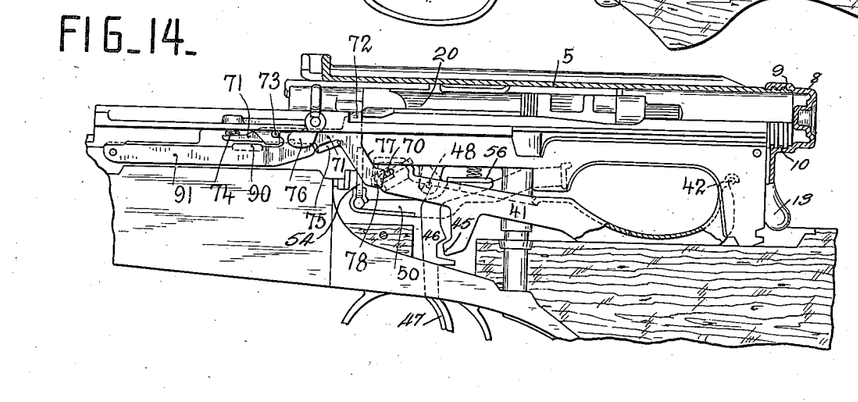
Figures 15, 16, 17, 18, 19, 20, 21:
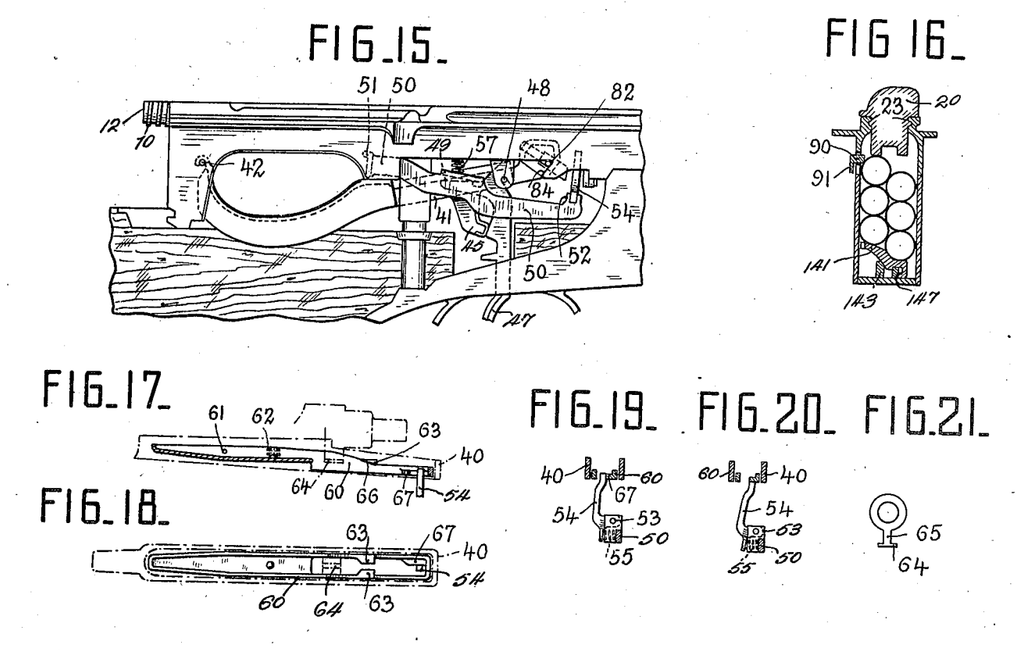
Figure 22:
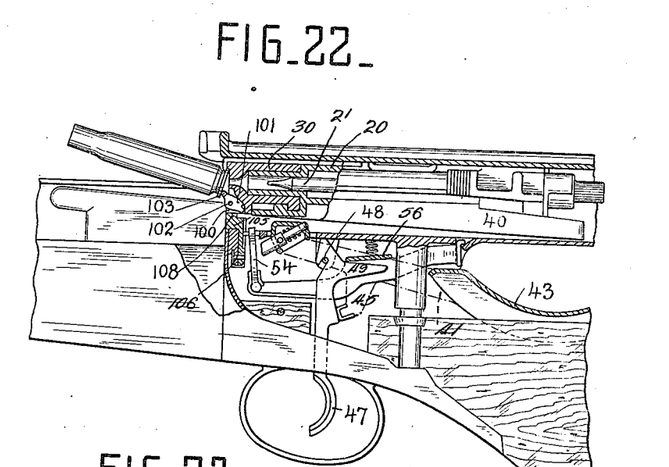
Figures 23, 25, 26:
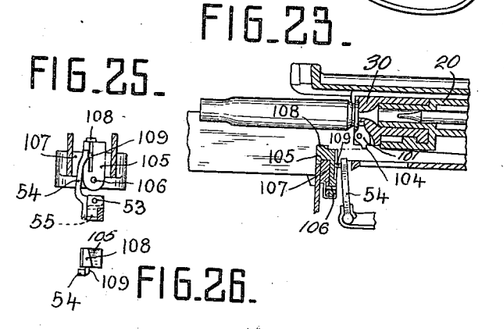
Figure 24:
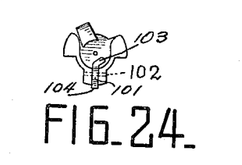
Fig 24 is an end view of the slider showing the cartridge ejector mounted therein, parts of the locking head shown in Fig. 10 being omitted.
Figures 27, 28, 29, 30:
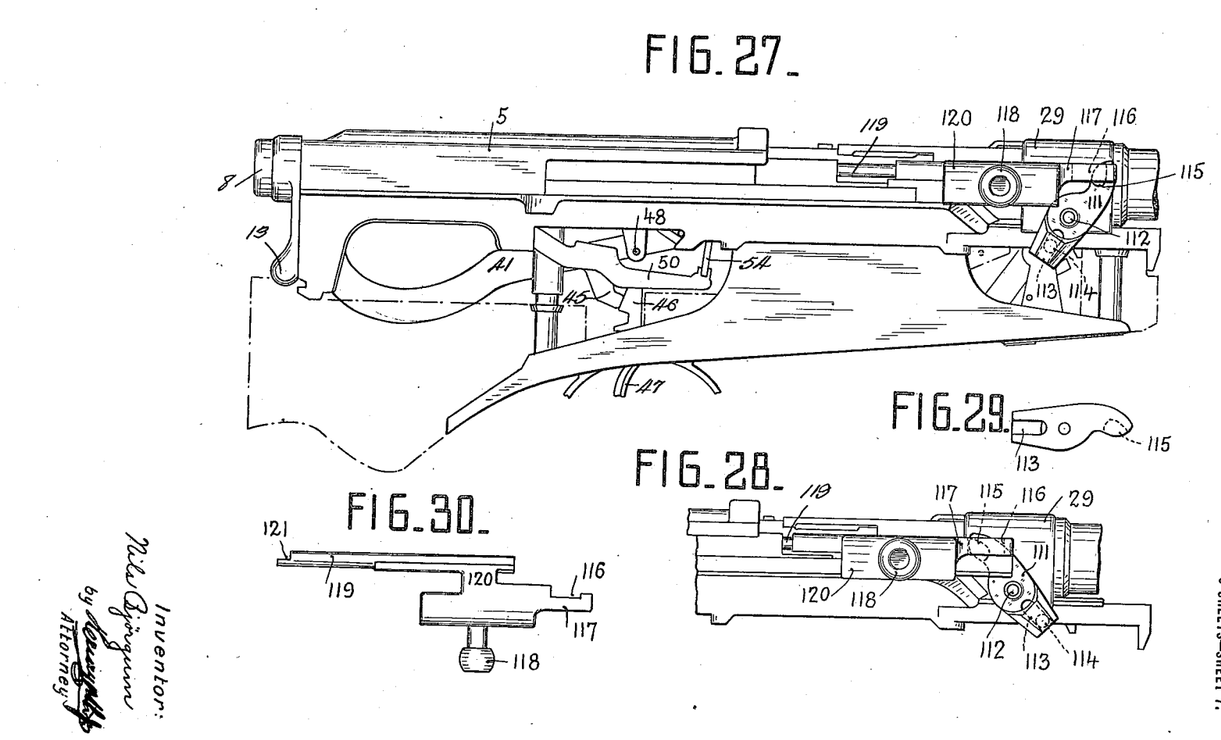
Fig. 27 is a right hand side view of the breech part of the gun showing the recoil lever in its position before the firing of the gun and Fig. 28 is a similar (partial) side view showing the recoil lever in its position after the recoiling movement of the gun barrel.
Fig. 29 shows the recoil lever from the left hand side and Fig. 30 is a top plan view of the cocking rod.

In the wall of the magazine is arranged a stop lug 90 (Figs. 13, 14 and 16), which is carried by a spring arm 91; the shift arm 76 comes into contact with this arm 91 when it has the position shown in Fig. 14 and the lug 90 is thereby pressed inwardly so it enters the magazine in such manner that six cartridges are arrested in the magazine, so that the slider can work freely without carrying a cartridge with it into the barrel (see Fig. 16).

The lever 71 has at its rear end a downwardly projecting arm 77 formed with a knee 78. The aforesaid pin 70 normally rests on the top side of said knee. The pin is pressed downwardly and as it is at the same time capable of a rearward movement, the result will be that it takes the lever 71 with it downward and thereby the stop lug or shoulder 72 is pressed down so that the slider is released; the slider through the pressure of the recoil spring then passes forward to its locking position.

I shall now describe the arrangement of the pin 70 in the head of the safety lever and its function. The pin is carried by a small piston 80 (see Fig. 11) the latter having an inclined position in the head and is pressed downwardly by a spring 79. The pin 70 being guided in an inclined aperture 81 in the left hand side of the head. A similar pin 82 (Fig. 15) projects from the piston 80 on the opposite side of the head and has its guide in an inclined aperture in that side of the head. The latter pin rests against an inclined face 84 on the right hand side on the breech casing. When the safety lever 41 is pressed downwardly the said inclined face 84 will act on the pin 82 and the piston 80 and the pin 70 on its other side is given a rearward movement. At the same time the pin 70 presses against the knee 78 on the lever 71 and hereby pushes this lever downwardly as before mentioned.

By this arrangement the soldier may at any time choose the firing tactic that suits the situation of the fighting, it being possible for him to change the function of the gun from that of a single loader to that of a magazine loader or vice versa in a moment.

The gun is used in the following manner: To fill the magazine the soldier draws the slider 20 by hand rearwardly. The slider is then prevented from going forward again by the cartridge feeding mechanism, which by its spring is pressed upwardly in the path of the slider. The cartridge holder (holding seven cartridges) is then placed in the magazine mouth and the cartridges pressed down into the magazine. When the cartridge holder is then taken away the mechanism will automatically take its locking position. If now the shift arm 76 is in the position shown in Fig. 14, six of the cartridges will be arrested by the aforesaid lug 90 and kept as reserve in the magazine, the said lug keeping the cartridges out of the path of the slider. Only the seventh cartridge will in this position of the shift arm 76 come into use, it being carried into the barrel chamber by the slider when the cartridge holder is taken away. When firing, the mechanism will automatically come into its open position after each firing. A new cartridge may now be inserted into the chamber by hand. The soldier now releases the safety lever 41 so that the latter takes its upper position. The pin 70 in the head of the safety lever thereby comes to rest on the top of the knee 78. The soldier now again pressing the safety lever downward, the pin 70 will take along with it the lever 71 and thereby the shoulder 72 will loose its hold on the slider so that the slider is released and returns to its locking position.

*The ejector.*

The arrangement of the ejector is shown in Figs. 22 to 26.

A special feature of my invention is the arrangement of an ejector, the same being so arranged that it enters into function first when the slider has begun to move from its rearmost position. By this arrangement a cartridge shell when it is thrown out is thrown forward and is not as usual liable to go rearward.

The ejector consists of a body 101 which is pivoted in a groove 100 (Fig. 10) in the locking head of the slider 20 on a horizontal pin 102 (Fig. 24); it has a lug 103 at its top which lug when the ejector is at rest is wholly taken up within the said groove 100. At its lowermost point the ejector has a tail 104 which when the ejector is at rest projects out from the groove in the slider. In the bottom of the breech casing is mounted a small arm 105 pivoted on the pin 106 and being guided on a cross piece 107. The said arm has at its top a small lug 108, the right hand side of which is inclined in such way that the broadest part of the lug is at the rear. This lug is situated in the path of the tail 104 of the ejector. The said arm 105 is provided with a lug 109 on which is pressing with a lateral pressure the sear pin 54 before described, which latter is pivoted at 53 and is acted upon by the spring 55 so that the lever 54 will always keep the arm 105 with the lug 108 pressed to the right.

The action of these devices is as follows: When the slider with its locking head and the cartridge shell held by the extractor is thrown rearwardly by the recoil, the tail 104 of the ejector will hit the inclined face of the lug 108, whereby the arm 105 will be pressed to the left and the ejector pass behind the lug 108. When the slider again moves forward the arm 105 will again have taken its normal position to the right and the tail 104 of the ejector will then be stopped by the rear face of the lug 108. This will cause the ejector to turn on its pivot so that its top lug 103 will forcibly loosen the shell from the extractor. As the loosening of the shell takes place when the shell is at full speed forward, it will, when it has been released, continue its forward motion.

*The recoil lever mechanism.*

Figs. 27 to 30 illustrate the mechanism whereby the recoil movement of the barrel is utilized for cocking the gun. This mechanism comprises a lever 111 which is pivoted on the right hand side of the barrel sleeve on a pin 112. With its upper end this lever is in contact with the cocking piece of the slider and with its lower end the said lever is in contact with the breech casing. For this purpose the lower end of said lever is on its inner side provided with a longitudinal groove 113 fitting over a pin 114 projecting from the breech casing. The upper end of the lever is on its outer side provided with a lug 115 which fits into a groove 116 on an arm 117 projecting forwardly from the cocking piece 120. Thus the cocking lever is connected with the said three parts in a positive manner. The cocking piece 120 is provided with a handle 118 and has a guide rod 119 which fits into a corresponding boring in the slider. 121 is a notch in the rear end of this rod, which notch coöperates with a cocking lug of the firing pin in such way that the latter is carried rearwardly when the cocking lever moves rearwardly during the recoil movement of the barrel.

By uniting the barrel sleeve with the cocking piece in this manner the parts are positively connected during their movements, thereby making the manipulation of the gun by hand easier and increasing its safety of function. The gun can be cocked without first opening the mechanism and the speed of the barrel during the recoil is lessened before it is entirely stopped, part of its energy being transferred to the firing and recoiling spring through the just described lever arrangement.

The barrel arresting mechanism.

The devices for arresting and locking the barrel when it has come to its rearmost position by the recoil action are shown in Figs. 31 to 34.

Figures 2, 3:
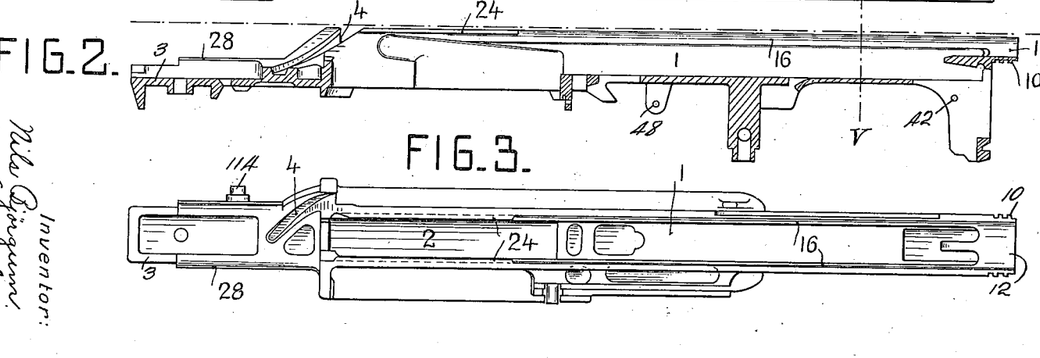
Figure 7:
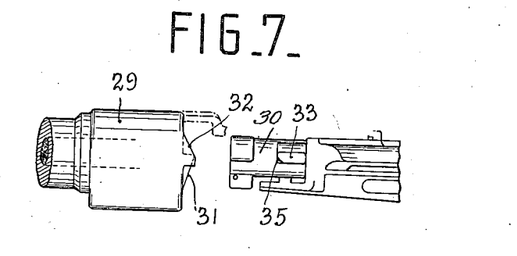
Fig. 7 is a left hand view of the rear end of the gun barrel with sleeve and of the front end of the breech bolt or slider in their relative position before the locking movement.
Figure 8:
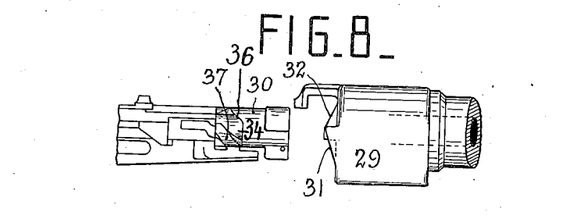
Fig. 8 is a corresponding right hand view.
Figure 9:
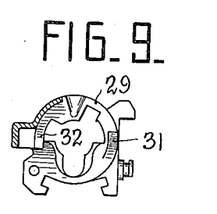
Fig. 9 is a rear end view of the barrel sleeve and Fig. 10 a front end view of the slider with its locking head.
Figure 10:
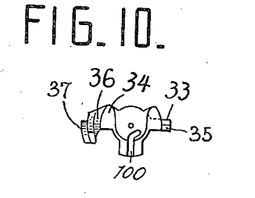

The barrel sleeve 29 slides on two ribs 28 on the breech casing 1 (see also Figs. 2 and 3). A spring 27 surrounding a rod 26 secured to the barrel sleeve and being guided in a boring 25 in the breech casing presses the barrel sleeve with the barrel in a forward direction. On the left side the barrel sleeve has a rearwardly extending arm 130 and at the rearmost end of this arm a latch arm 131 is carried by the pivot 132. As will be seen from Fig. 32 this latch arm, when the barrel sleeve and barrel are in the rearmost position, abuts with its foremost end against a lug 133 formed on the breech casing and is held in this position by the spring 134. On the inner side of the latch arm an inclined lug 135 is formed and on the slider a similarly formed lug 136 is placed.

Figure 31:
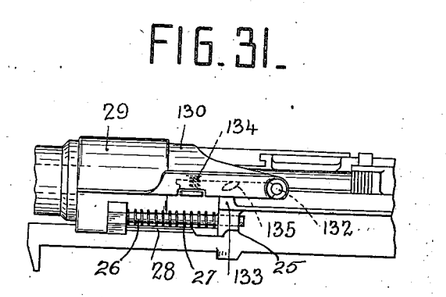
Figure 32:
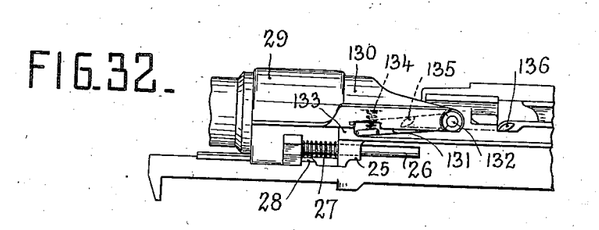
Figure 33:
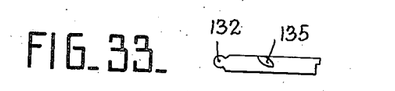
Fig. 33 and Fig. 34 show the barrel locking arm from the side and from above.
Figure 34:
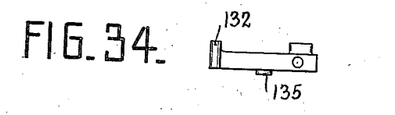

When the slider from its rear position approaches its locking position (see Fig. 32) the lug 136 will hit the lug 135 on the latch arm and lift the latter to the position shown in Fig. 31. At the same time the locking lugs of the locking head have taken hold of the corresponding locking faces in the barrel sleeve and the slider together with the barrel sleeve then move forward to their foremost position. After firing when the barrel with its sleeve recoils the arm 131 slides on the top of the lug 133 until it has passed the lug when the weight of the latch arm and the spring 134 forces it down to its locking position (see Fig. 32).

The cartridge feeder.

Figure 35:
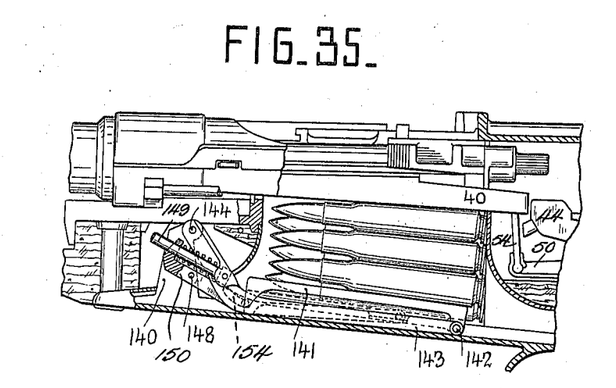
Figure 36:
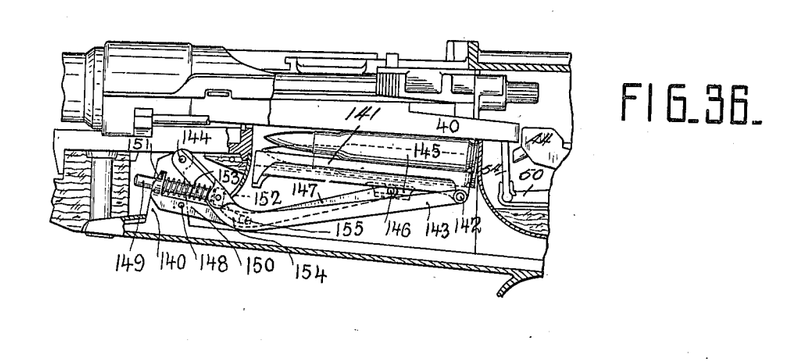

The cartridge feeding mechanism which is shown in two different positions in Figs. 35 and 36 consists of two levers connected with the cartridge carrier in such way that the angular position of the latter relatively to the axis of the gun barrel is altered during the lifting movement, so that the top cartridge in any position of the feeder will have the same angular position relatively to said axis.

The cartridge carrier 141 is connected at its rearmost end by a pin 142 with the feeding arm 143, the latter being pivoted at 144. On the underside of the carrier there is arranged a slotted guide 145 into which projects a pin 146 on an arm 147. The latter arm is pivoted at 148, and the pivot 144 as well as the pivot 148 are carried by a lug 140, projecting upwardly from the bottom piece of the magazine. The arm 147 has an extension 150 in front of its pivot, said extension carrying a guide 151 in which works a pin 149, secured to a knee 152 of the feeding arm 143. Around this pin is placed a spiral spring 153 acting to press both the feeding arm 143 and the arm 147 in an upward direction.

Below the knee 152 in the feeding arm 143 there is arranged a curved slot 154 into which projects a pin 155, secured to the arm 147. When this slot is given a proper form and position the two arms will be so connected that when moving upwardly their front ends will lie in a line, the angle of which relatively to the axis of the barrel will be decreasing as the arms approach the axis.

I claim:

1. In an automatic magazine gun, the combination of a barrel recoiling to a point in front of the magazine, means for locking the barrel in its recoiled position, a breech bolt comprising a slider capable only of a rectilinear motion and a locking head capable only of a rotatory motion relatively to the slider, a member capable of a transverse movement relatively to the slider and adapted to automatically lock the latter in its foremost position and means actuated by the movement of said member for locking the slider in open position.

2. In an automatic magazine gun, the combination of a barrel recoiling to a point in front of the magazine, a pivoted lever for locking the barrel in the recoiled position, a breech bolt comprising a slider capable only of a rotatory motion relatively to the slider, and a member capable of a transverse movement relatively to the slider and adapted to automatically lock the slider in its foremost position, a spring for holding said member normally in its locking position and means actuated by the movement of said member for locking the slider in open position.

3. In an automatic magazine gun, the combination of a barrel recoiling to a point in front of the magazine, means for locking the barrel in its recoiled position, a breech bolt comprising a slider capable only of a rectilinear motion and a locking head capable only of a rotatory motion relatively to the slider, a member capable of a transverse movement relatively to the slider and adapted to automatically lock the latter in its foremost position and simultaneously lock the trigger mechanism and means actuated by the movement of said member for locking the slider in open position.

4. In an automatic magazine gun, the combination of a barrel recoiling to a point in front of the magazine, means for locking the barrel in its recoiled position, a breech bolt comprising a slider capable only of a rectilinear motion and a locking head capable only of a rotatory motion relatively to the slider, a lever pivoted near its rear end close below the slider so as to be capable of a swinging movement in the vertical axial plane of the gun, said lever being at its forward end adapted in its raised position to lock the slider in its foremost position and being at a suitable point in front of its pivot so shaped that it forms a rest for the thumb of the right hand during firing, and a spring to yieldingly hold the lever in its raised position against the presseure of the thumb.

5. In an automatic magazine gun, the combination with a recoiling barrel, of means for locking the barrel in front of the magazine, a breech bolt comprising a slider capable only of a rectilinear motion and a locking head capable only of a rotatory motion relatively to the slider, a member capable of a transverse movement relatively to the slider and adapted to lock the slider in its foremost position and simultaneously lock the trigger mechanism, another member also capable of a transverse movement relatively to the slider and adapted to arrest the latter in a position in rear of the magazine on its travel from its open to its locking position, a spring keeping this member normally in its locking position and means operated by the first member to move the latter member from its locking position so as to release the slider.

6. In an automatic magazine gun, the combination with a recoiling barrel, and a slider having a rectilinear movement, of a lever to lock the barrel and the slider in locking position, a lever to lock the slider in its open position behind the magazine, a spring actuated sliding member carried by the first named lever, having a laterally projecting part resting on an actuating face on the second named lever and having another projecting part resting on a face on the breech casing, the said faces lying in planes crossing each other and crossing the plane of movement of the spring actuated member.

7. In an automatic magazine gun, a recoiling barrel, a slider, a lever for locking the slider in its locking position, a lever for locking the slider in its open position, means operated by the first named lever to lock the trigger mechanism, means operated by the same lever to act upon the other lever to move the same from its locking position to release the slider, means independent of the aforesaid means, whereby the last named lever can be removed and locked in a position out of the path of the slider.

8. In an automatic magazine gun, a recoiling barrel, a slider, a lever for locking the slider in its locking position, a lever for locking the slider in its open position, means operated by the first named lever to lock the trigger mechanism, means operated by the same lever to act upon the other lever to move the same from its locking position to release the slider, a spring arm having a lug projecting laterally through the magazine wall, and a shift arm pressing in one position on the spring arm to cause the said lug to project into the magazine and into the path of the cartridges, and pressing in another position on the aforesaid lever for locking the slider in open position so as to move and lock the said lever in a position out of the path of the slider.

9. In an automatic magazine gun, the combination with a recoiling barrel and means for stopping and locking it at a certain point of its travel, of a breech bolt, comprising a slider, capable of a rectilinear motion and a head capable only of a rotatory motion relatively to said slider, a firing pin in the slider, a cocking piece mounted on the slider, a laterally arranged recoil lever pivotally connected with the barrel in front of the magazine, and adapted to actuate the cocking piece when the barrel recoils, a spring actuated lever mounted on the slider adapted to lock the firing pin in its cocked position, a sear pin actuated by the trigger of the gun to press the said lever out of its engagement with the firing pin a lever to lock the slider in its foremost position, and means actuated by the movement of the locking lever to lock the slider in open position.

10. In an automatic magazine gun, a breech bolt comprising a slider capable of rectilinear motion and a head capable of a rotatory motion relatively to said slider, a firing pin within the slider, a breech casing having a rear part formed with cylindrical faces serving as guide faces for the slider and a front part provided with longitudinal ribs corresponding with grooves in the slider, a downwardly and rearwardly extending rectangular frame projection on the bottom of the slider, the rearmost face of which frame is adapted to abut against a stopping member serving to lock the slider in its foremost position, and a spring actuated lever pivoted within said frame, adapted to lock the firing pin in its cocked position.

11. In an automatic magazine gun, a breech bolt comprising a slider capable of rectilinear motion and a head capable only of a rotatory motion relatively to said slider, a firing pin within the slider, a breech casing having a rear part formed with cylindrical faces serving as guide faces for the slider and a front part provided with longitudinal ribs corresponding with grooves in the slider, a downwardly and rearwardly extending rectangular frame projection on the bottom of the slider, the rearmost face of which frame is adapted to abut against a stopping member serving to lock the slider in its foremost position, a spring actuated lever pivoted within said frame and having a rectangular aperture in the rear part thereof, lugs projecting laterally in the said aperture, a cocking lug positively connected with the firing pin and having a stem portion adapted to pass between said lateral lugs and a head adapted to be engaged by said lugs, the lugs on the lever having forwardly and downwardly directed inclined faces.

12. In an automatic magazine gun, a breech bolt comprising a slider capable of rectilinear motion and a head capable only of a rotatory motion relatively to said slider, a firing pin within the slider, a breech casing having a rear part with cylindrical faces forming guides for the slider and a front part provided with longitudinal ribs corresponding with grooves in the slider, a downwardly and rearwardly extending rectangular frame projection on the bottom side of the slider, the rearmost face of which frame is adapted to abut against a stopping member serving to lock the slider in its foremost position, and a spring actuated lever pivoted within said frame and having a rectangular aperture in the rear part thereof, a trigger, a sear arm in operative relation to the latter, a sear pin on the sear arm, and a lug in the rearmost part of the aperture for shifting the sear pin.

13. In an automatic magazine gun, the combination with a breech bolt comprising a slider capable of rectilinear motion and a head capable only of a rotatory motion, of a trigger, a sear arm actuated by the trigger, a sear pin pivotally connected with the sear arm and capable of transverse movement, a spring holding the sear pin in its normal position, a spring actuated lever on the slider having a rectangular aperture therein, a sear lug in the rear part of said aperture having a forwardly directed inclined face adapted to press the top end of the sear pin laterally when the slider approaches its locking position before the sear pin has been released by the trigger.

14. In an automatic magazine gun, the combination with a recoiling barrel, of means for locking it in front of the magazine, a breech bolt comprising a slider capable only of a rectilinear motion and a locking head capable only of a rotatory motion relatively to the slider, an ejector pivotally mounted within a substantially radial slot in the locking head and having a top lug normally hidden within said slot and a tail piece projecting outside of the path of the locking head in a downward direction, a laterally movable spring actuated arm mounted below the slider, and a lug on the top of said arm having an inclined forwardly directed lateral face in the path of the tail-piece of the ejector, said lug adapted to engage said tail-piece during the forward movement of the slider to violently force the top lug of the ejector out of the slot in the head and thereby loosen the cartridge shell to throw it in a forward direction.

15. In an automatic magazine gun, a recoiling barrel, a breech block composed of a slider with rectilinear movement and a locking head with rotatory movement, the combination with the trigger mechanism comprising a spring actuated sear pin adapted to swing in a transverse direction relatively to the slider, of an ejector mechanism comprising an ejector body pivotally connected with the locking head so as to swing in the vertical axial plane of the gun, and an actuating lug mounted on the breech casing and capable of a transverse movement and having a face in contact with the sear pin so as to be normally held in the path of the lowermost part of the ejector body by the spring action of the sear pin.

16. In an automatic magazine gun having a recoiling barrel and a breech block composed of a slider having rectilinear movement and a locking head having rotatory movement, the combination with the slider having cylindrical guides, a breech casing comprising a bed-portion and a removable top or cover, the latter extending only from the rear end of the breech casing to a point near the rear wall of the magazine, two guide ribs on the breech casing bed on the part of the same in front of the cover, said ribs having a substantial radial direction and corresponding with grooves in the slider, cylindrical guide-faces in the rear part of the breech casing and in the removable top, lateral ribs near the lower edges of the said top, lateral grooves in the breech casing corresponding with said ribs, and means to lock the top to the breech casing.

17. In an automatic magazine gun, the combination with recoiling barrel and means for stopping and locking the barrel at a certain point of its travel, of a breech bolt comprising a slider capable of a rectilinear motion and a head capable of a rotary motion relatively to said slider, a firing pin in the slider, a cocking piece mounted on the slider and having a guide rod fitting into a corresponding bore in the slider, a two-armed laterally arranged recoil lever pivotally connected with the barrel having its upper end in contact with cocking piece and its lower end in contact with the breech casing, said guide rod having a notch which coöperates with a lug on the firing pin, whereby the latter is carried rearwardly during the recoil movement of the barrel.

18. In an automatic magazine gun, a recoiling barrel, a breech block composed of a slider capable of rectilinear movement and a locking head capable of rotary movement on the slider, said locking head having a lug engaging a groove in the breech casing and adapted to actuate the lug to rotate the locking head during engagement with the barrel sleeve, two diametrically arranged cams on the locking head adapted to engage two diametrically arranged helical faces on the barrel sleeve whereby the locking head is caused to rotate during the recoiling movement and cause an initial extraction of the cartridge shell, an ejector body pivotally mounted in the locking head, and a lug mounted in the breech casing adapted to actuate said ejector body during the recoil of the slider.

In testimony that I claim the foregoing as my invention, I have signed my name in presence of two subscribing witnesses.

NILS BJÖRGUM.

Witnesses:
C. FABRICIUS HANSEN,
E. NORMAN.